March 1, 1949.  A. H. RODECK ET AL  2,463,495
FLUID PRESSURE CONTROL SYSTEM
Filed Jan. 19, 1944  2 Sheets-Sheet 1

INVENTOR
ARMIN H. RODECK
AND
BY ALBERT G. MASSEY
Beau, Brooks, Buckley & Beau
ATTORNEYS

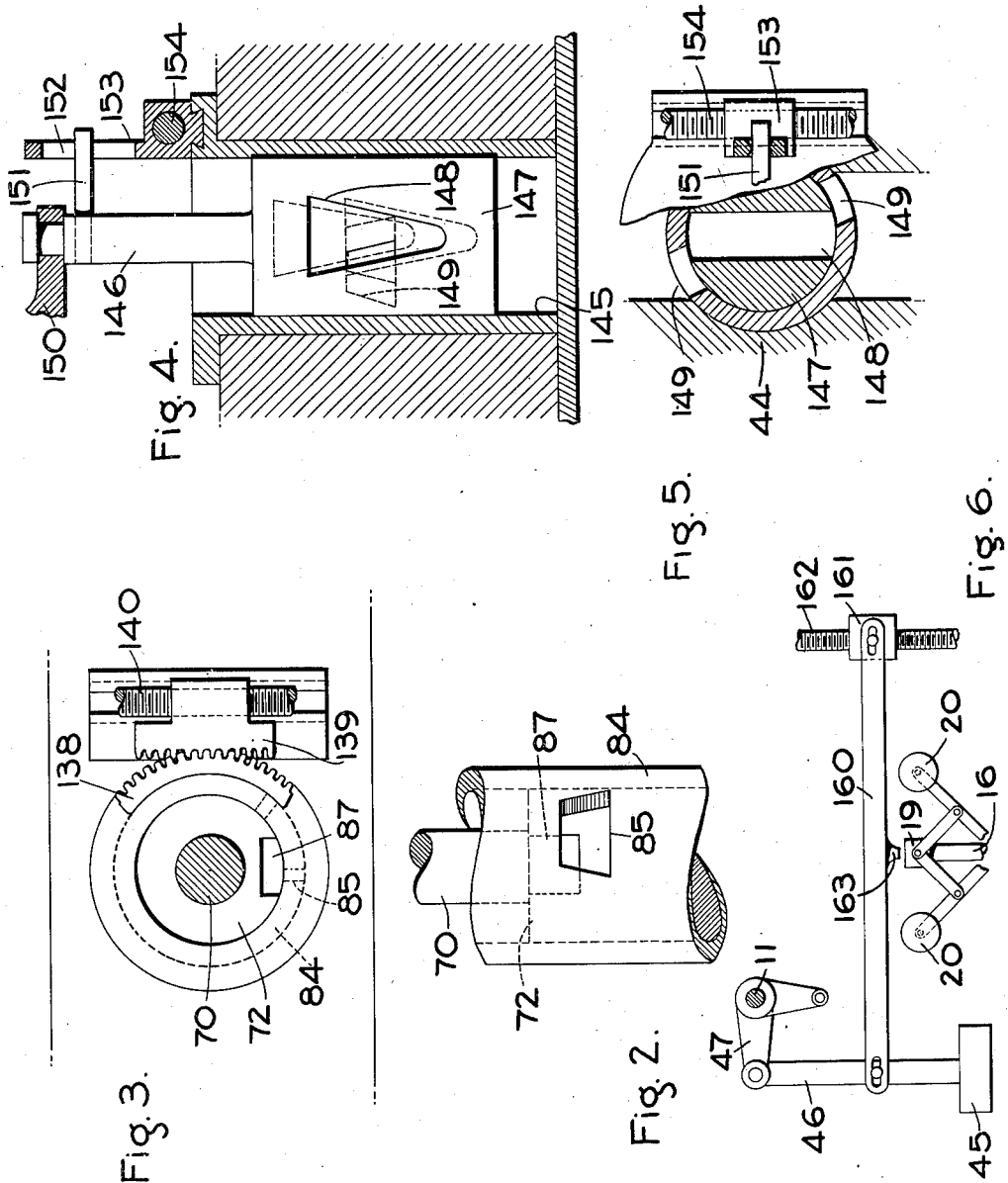

Patented Mar. 1, 1949

2,463,495

UNITED STATES PATENT OFFICE 2,463,495

FLUID PRESSURE CONTROL SYSTEM

Armin H. Rodeck and Albert G. Massey, Watertown, N. Y., assignors to Massey Machine Company, Watertown, N. Y.

Application January 19, 1944, Serial No. 518,786

8 Claims. (Cl. 121—42)

This invention relates to governors and particularly to governors of the general type wherein a hydraulic relay acts between the speed responsive element and the controlling instruments which are governed thereby.

The problem of providing a governor of the general kind here under consideration has been variously approached in the prior art. According to the present invention an apparatus is provided which, among other things, is responsive purely to the action of centrifugal force upon a speed indicating element, without the usual interposition of spring biasing means. The inherent difficulty of precisely predicting the behaviour of mechanical spring means under varying loads introduces a considerable factor of error in governor systems where this mode of biasing the centrifugal elements is relied upon. In the apparatus of the present invention the centrifugal force of the speed indicating device interacts directly with hydraulic pressure means, insofar as the response of the indicating device to changes in speed is concerned, with no mechanical counter forces of any kind.

Heretofore in the prior hydraulic governor art it has not been practical to connect the actuating piston pilot valve directly to the centrifugal force means for movement directly thereby. It has been general in the art to provide various kinds of adjustable and shiftable linkage or other mechanical connections or various intermediate hydraulic relays. By virtue of the novel principles herein disclosed, the present invention makes it entirely practical and feasible to provide a throttle controlling actuating piston and cylinder with a pair of conduits from opposite sides of a pilot valve, the latter being directly movable by and with all movements of the fly-weight mechanism or other speed-indicating means. This is accomplished without the necessity for any intervening operative agencies, mechanical, hydraulic or otherwise. All such governor characteristics and functions as sensitivity, rapidity, load limit, speed setting, compensation, etc., are provided for by a single simple hydro-dynamic biasing pressure which directly opposes the direct action of the centrifugal mechanism against the actuating piston pilot valve.

Hydraulic governor systems of the prior art have relied largely on floating lever systems for accomplishing the various governing, compensating and control functions which are required. The present invention provides a hydraulic control and compensating system wherein the required levers and linkages have pivot axes which are relatively fixed during normal compensating and control operations and do not require adjustment even to alter or adjust the operating characteristics of the governor. The only exceptions noted are that the percentage of speed droop and the proportion or "magnitude" of adjustment are adjusted by means of shiftable fulcrums. No other lever arm adjustments are required for full control, adjustment and regulation.

The present invention provides a hydraulic governor system wherein the degree of control is determined, in the first instance, by the degree of unbalance between a controlled hydro-dynamic fluid pressure and the direct force influence of the speed indicating element, in the illustrative embodiment the centrifugal fly-weight head.

According to the present invention a hydraulic governor is provided wherein the pilot valve for the prime mover fuel control actuating piston is controlled only by hydro-dynamic pressure influence and centrifugal force and the pilot valve is entirely without connected mechanical operating parts and is not biased or influenced by other levers; that is, the pilot valve does not serve as a fulcrum for compensating or restoring levers and linkages. There are no extraneous connections with the pilot valve and the centrifugal force means.

The governor of the present invention is equally and highly sensitive at all speeds in its range because the difference in centrifugal force for speed changes at the low speed range is less than at the high speed range, but at the same time the hydraulic pressure opposing centrifugal force is also less at low speed ranges, so that the compensating valve has less effect and the governor is therefore just as sensitive as at higher speeds.

A further aspect of novelty of the governor of the present invention resides in the fact that it requires no manual manipulation or holding open of valves until sufficient operating pressure is built up at the commencement of governor operation, as has been the case with prior art governors. An extremely important safety provision in any hydraulic governor installation is the provision of means for moving the governor to its engine shut-down position in the event of whole or partial loss of hydraulic pressure for any reason whatever. In prior art hydraulic governors this has required the provision of auxiliary elements of more or less complexity and questionable reliability. In the governor of the present invention loss of operating pressure automatically and directly moves the pilot valve to a position where the actuating piston moves to shut-down position.

These and various other novel features of the present invention, besides making for simplicity of construction and arrangement and greater dependability, result in much greater accuracy of control than in the case of the more complex and less dependable arrangements heretofore known.

A full and complete embodiment of the principles of the present invention, together with a minor modification thereof, are shown in the accompanying drawings by way of example, but it is to be understood that the invention is not limited in spirit or scope otherwise than as defined in the appended claims.

In the drawings:

Fig. 2 is a fragmentary detailed elevational view of the compensating valve of Fig. 1 on an enlarged scale.

Fig. 3 is a fragmentary detail plan view of the valve of Fig. 2, partly in cross section;

Fig. 4 is a detailed fragmentary view similar to Fig. 2 but showing a modified form of pilot valve;

Fig. 5 is a fragmentary cross sectional plan view of the valve of Fig. 4; and

Fig. 6 is a fragmentary schematic view of an alternative load-limit adjustment.

Figure 1:
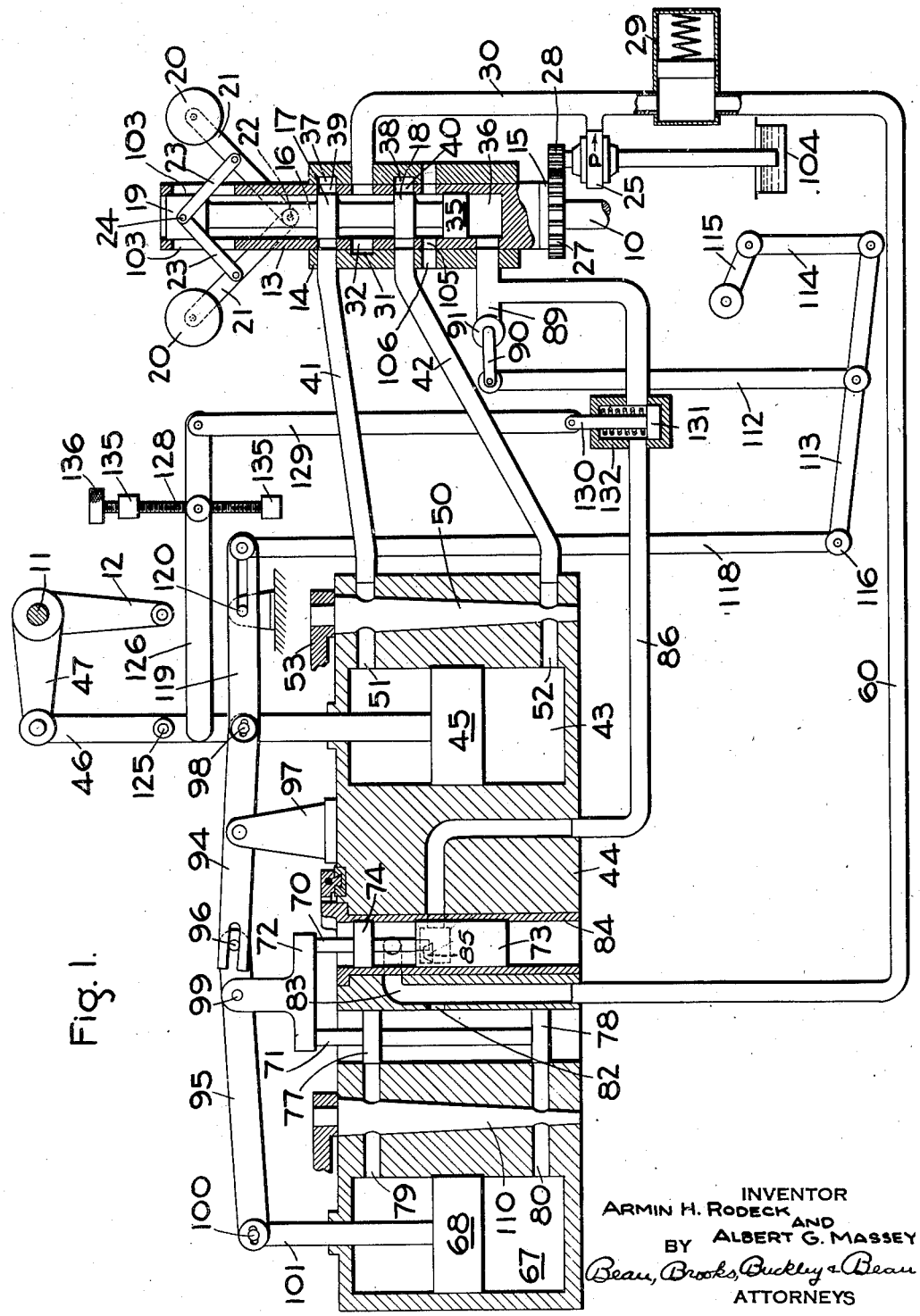
Fig. 1 is a general schematic showing of one form of the governor of the present invention.

Like characters of reference denote like parts throughout the drawings and description and the numeral 10 designates a shaft which is connectible with the engine or other device or system to be governed. The purpose and effect of the governor system is to maintain a constant velocity of the shaft 10 despite changes in load, in the case of an engine, or of other conditions tending to vary the velocity of the shaft 10. In the alternative the governor serves to maintain a constant degree of speed droop, that is, a predetermined lessening of velocity with increases in load. The system of the present invention is readily adjusted to varying degrees of speed droop, as occasion may require, including adjustment to zero speed droop, in which case the velocity is maintained constant regardless of the load, within predetermined maximum load limits. Speed droop and the ability to accurately regulate it are principally desirable where multiple prime movers are operating in parallel against a common load and it is desired that the load be uniformly distributed over the several prime movers.

Adjustment of the engine or other device or system being governed is accomplished by rotating a shaft designated 11 in Fig. 1 and in the case of an engine the shaft 11 may be connected with the throttle valve or other fuel control means, as by means of an arm 12. In engine governor operation the load on the engine is reflected in the setting of shaft 11.

The fly-weight head and the hydro-dynamic fluid system which cooperates therewith is shown at the right of Fig. 1 and comprises a shaft or sleeve 13 rotatable in a support 14 and having a resilient driving connection 15 with the shaft 10 which is driven by the engine being governed. The shaft 13 is axially bored to receive a pilot valve 16 which has enlarged axially spaced valve heads 17 and 18 and is formed at its upper end with an enlargement 19 for cooperating to support a plurality of fly-weights 20. The fly-weights 20 are carried by arms 21 which have a common pivot 22 at the outside of shaft 13. The arms 21 are pivotally engaged by links 23 which are also pivotally connected to the enlargement 19 of pilot valve 16 as at 24. From the foregoing it will be clear that any tendency of centrifugal force to move the fly-weights outwardly, upon increase in speed of the shafts 10 and 13, tends to straighten the toggles which the arms 21 and the links 23 form, and this results in lowering movement of the valve 16 in the bore of the shaft 13. A decrease in speed, evidenced by a tendency of the fly-weights to move inwardly toward the shaft 13, tends to collapse the toggles, and the links 23 accordingly raise the pilot valve 16 in the shaft 13. The pilot valve 16 is free to move axially in the shaft 13 but rotates therewith.

The necessary hydraulic pressure required for operation of the governor is provided by a pump, indicated at 26, which may be arranged to be driven from shaft 10 by a pair of gears 27 and 28. The pump 26 is preferably of the reversible type wherein the output is uni-directional regardless of the direction of rotation of the pump drive means. The pump communicates with a conventional hydraulic pressure accumulator indicated at 29 by means of a conduit 30, and the conduit 30 extends to the support 14 where it communicates with an annular passage 31 formed in support 14 and extending about shaft 13, the latter having a series of peripheral openings 32 whereby conduit 30 has continuous and uninterrupted communication with the space between valve heads 17 and 18.

The pilot valve 16 is further formed at its lower end with a piston head 35 which cooperates with the bore of shaft 13 to form a fluid pressure chamber 36. The chamber 36 is provided, in a manner which will presently appear, with a selectively variable degree of hydro-dynamic fluid pressure, and such pressure acts against piston head 35 to oppose the downward thrust which the centrifugal action of the fly-weights 20 imparts to stem 16.

The housing 14 has a pair of annular passages 37 and 38 and the shaft 13 has a series of peripherally spaced openings in communication with each of the annular passages. The openings in shaft 13 are designated 39 and 40, respectively, and are normally axially in registry with the valve heads 17 and 18. The passages 37 and 38 have conduits 41 and 42, respectively, which communicate with the upper and lower side of a cylindrical chamber 43 formed in a housing element 44. A power or actuating piston 45 is disposed in chamber 43 and has a piston rod 46 which connects with an arm 47 secured to shaft 11 whereby movements of piston 45 in chamber 43 directly control oscillation of shaft 11 and accordingly directly determine and reflect the load setting of shaft 11, or any other variable condition which shaft 11 may serve to adjust.

In a general way, it will be seen from the foregoing that acceleration of shaft 10 will, by increased centrifugal force on fly-weights 20, lower pilot valve 16 and, by lowering of valve head 18, connect conduit 30 with conduit 42. This directs fluid pressure against the lower side of piston 45 and accordingly rotates shaft 11 in a clockwise direction to decrease the fuel setting, in instances where an engine is being governed, to accomplish the necessary slowing of shaft 10 to the predetermined speed level. As stated in the preamble hereto, the actuating piston may be used for regulating other variables in other governor applications.

In Fig. 1 the numeral 50 designates a tapered plug valve which extends across and controls passages 51 and 52 which connect the conduits 41 and 42 with cylindrical chamber 43. The valve 50 is manually adjustable as by means of a handle 53 and its position of adjustment determines the effective cross sectional areas of passages 51 and 52 and this controls the rapidity with which actuating piston 45 responds to changes in velocity of the input shaft 10 and thus permits selective adjustment of the governor characteristic which is termed "rapidity" by those skilled in the art. "Rapidity" is a term denoting the speed with which the actuating piston moves from one fuel setting to another. Instances where best regulation is attained by free and accurate adjustment of "rapidity" are found in the control of prime movers, notably two-cycle gasoline engines.

It will be noted that a further conduit 60 leads from accumulator 29 to housing 44 and this conduit supplies fluid pressure which ultimately serves as the source of adjustable hydro-dynamic fluid pressure in chamber 36 beneath piston 35 of pilot valve 16. The manner in which the pressure in chamber 36 is controlled to effect what is known in the art as "compensation" will now be described.

It is well recognized that the lag in response of a governor controlled prime mover to opening or closing movement of the throttle introduces a factor of "over-governing" which tends to produce "hunting" or "racing" of the prime mover. To avoid such hunting, hydraulic governor systems are generally provided with one or another form of compensating means. The compensating means of the system of the present invention is relatively simple, direct and extremely accurate in result. The housing 44 is provided with a compensating piston chamber 67 and a piston 68 is disposed for reciprocation therein.

In Fig. 1 the numeral 70 designates a compensating valve and the numeral 71 designates a balanced pilot valve for the compensating piston 68, the valves 70 and 71 being fixed for joint axial movement in the housing 44 as by means of a bracket 72. Compensating valve 70 has a valve head 73 and a closure piston 74 spaced axially therefrom. The balanced valve 71 has a pair of spaced valve heads 77 and 78 which are normally in registry with lateral passages 79 and 80, respectively, which lead to compensating piston chamber 67 at opposite sides of compensating piston 68. Conduit 60 from the fluid pressure source leads to the space between the heads 77 and 78 of balanced valve 71, by means of passage 82, and also to the space between compensating valve head 73 and closure piston 74, by means of a passage 83.

In the form shown in Fig. 1 a sleeve 84 intervenes between the housing 44 and compensating valve 70 and sleeve 84 has an opening 85 of trapezoidal shape which establishes communication with the fluid pressure chamber 36 below pilot valve 16 by means of a conduit 86. As shown in clearer detail in Figs. 2 and 3, compensating valve head 73 has a notch 87 which provides restrictable and variable fluid pressure communication between fluid pressure supply conduit 60 and the conduit 86 leading to the chamber 36 beneath pilot valve 16. Axial movement of valve 70 enlarges or constricts the effective area for fluid passage through notch 87 and the trapezoidal opening 85 in sleeve 84 and consequently varies the hydro-dynamic pressure in conduit 86, this by reason of the fact that conduit 86 has an outlet passage portion 89 whose degree of outlet opening may be selectively varied by pivotal movement of an arm 90 which controls the degree of opening of an outlet valve 91 which may vary in form but in the illustrated instance is a common commercial form of valve known in the art as a cock or petcock.

Compensation is effected by means of a pair of levers 94 and 95 which have a pin and slot end-to-end pivotal connection 96. Lever 94 has an intermediate pivotal support 97 and its opposite end engages pivotally with actuating piston rod 46, as at 98. Lever 95 is pivotally supported at an intermediate point on bracket 72, as at 99, and its opposite end has a pivotal connection 100 with piston rod 101 of the compensating piston 68. The support 97 is adjustable lengthwise of lever 94 so that its effective lever arms may be varied. This determines the proportion of actuating piston adjustment for a given load change, a characteristic called "magnitude," and permits accurate matching of the governor to any engine or other device or system to be governed.

In normal operation and with the engine operating at a particular load and at a predetermined velocity setting, the hydro-dynamic fluid pressure in chamber 36 below pilot valve 16 is such as to balance the centrifugal force acting upon the fly-weights 20 and tending to urge the pilot valve 16 downwardly. Accordingly, the pilot valve remains in neutral position where the valve heads 17 and 18 close conduits 41 and 42, respectively.

However, upon an increase in speed of the fly-weights 20, their added centrifugal force overcomes the fluid pressure beneath pilot valve 16, as determined by the setting of outlet valve 91, and the pilot valve 16 moves downwardly to connect fluid pressure conduit 30 with conduit 42 through passages 31, 32, 40 and 38, thus moving actuating piston 45 upwardly in chamber 43. This rotates shaft 11 in a clockwise direction to reduce fuel supply, if the apparatus is being employed in governing a prime mover. At the same time fluid expelled from chamber 43 above piston 45 passes through conduit 41 and discharges within shaft 13 above valve head 17. Such discharged fluid may emerge from shaft 13 through openings 103 formed in shaft 13 to accommodate links 23. The fluid so discharged, which is conventionally a lubricant, lubricates the linkage and other parts therebeneath.

It will be understood by those skilled in the art that the entire mechanism of Fig. 1 may be housed in a suitable casing of any form whose bottom may be used as a sump for pump 25, whereby all discharge outlets of the system discharge openly into the casing, where they gravitate to the sump for re-use by the pump. The sump is indicated schematically at 104 in Fig. 1.

A decrease in centrifugal force resulting from a decrease in speed of shaft 10 and fly-weights 20 results in a reverse manner to open the fuel control. In such case, raising of pilot valve 16 connects conduits 42 with discharge passages 105 and 106 formed in the shaft 13 and the housing 14, respectively.

A compensating and restoring cycle of operation will now be described. When actuating piston pilot valve 16 is shifted upwardly in response to a decrease in speed of the input shaft 10, as has previously been described, the actuating piston 45 moves downwardly to increase supply of fuel to the prime mover being governed. This immediately rotates lever 94 in a clockwise direction and imparts an upward movement to the right hand end of lever 95. At this instant the left hand end of lever 95 comprises a fixed pivot since the compensating piston 68 is hydraulically locked in its chamber 67. Therefore, the compensating valve 70 is moved upwardly together with the balanced pilot valve 71. Thus, as the actuating piston 45 lowers, the compensating valve 70 rises and tends to restrict passage of fluid through notch 87 and passage 35 to lower the hydrodynamic fluid pressure in chamber 36 and, since this has a retarding effect on the upward movement of pilot valve 16, accordingly tends to stop movement of actuating piston 45 by reason of the restrictive effect thus created against the opening of passage 39 and conduit 41 to pressure from conduit 30. Simultaneously the compensating pilot valve 77 has moved upwardly to admit fluid to chamber 67 above compensating piston 68 which begins to move downwardly to restore the balanced pilot valve 71 and the compensating valve 70 to their initial positions.

The period of restoration of compensating valve 70 to initial position is adjustably proportioned to the speed with which the condition controlled by shaft 11 responds. Thus, in the case of an engine, as compensating valve 70 lowers during downward movement of compensating piston 12, the right hand pivot of lever 95 being stationary due to the arresting of piston 45, engine speed returns in synchronism and pilot valve 16 remains closed. In other words, when properly adjusted, the increasing centrifugal pressure on pilot valve 16 keeps pace with increasing hydrodynamic fluid pressure at the bottom of pilot valve 16, and since they remain in equilibrium the conduits 41 and 42 remain cut off by valve heads 17 and 18.

As restoration proceeds and compensating piston 68 lowers, its pilot valve 71 lowers with compensating valve 70 until the pilot valve heads 77 and 78 again are in registry with and close passages 79 and 80, whereupon compensating piston 68 is arrested and the governing and restoring cycle is complete.

The maintenance of exact equilibrium of pilot valve 16 during restoration, as above set forth, presupposes accurate adjustment of compensation to the speed with which the prime mover responds to a change in throttle opening. Any deviation, however, is simply and directly corrected automatically by a change in position of pilot valve 16, due to the unbalance, and actuating piston 45 thus moves to correct the condition of over- or under-governing by increasing or decreasing the initial oscillation of shaft 11.

A tapered plug valve 110 controls the passages 79 and 80 extending to the compensating piston chamber 67 and valve 110 may be adjusted to regulate the rate of return of balanced valve 71 and compensating valve 70 to maintain the desired equilibrium of pilot valve 16 during restoration. After a governing and restoring cycle is complete, the valves 70 and 71 and pilot valve 16 are all restored to their former neutral positions, only the actuating piston 45 and the compensating piston 68 occupying new positions.

For adjusting the speed at which the governor is set to regulate the prime mover, or to vary other desired operating constants in other governor applications, the outlet valve 91 is manually adjustable to control the size of the orifice leading from chamber 36 beneath pilot valve 16 and thereby control the hydro-dynamic pressure urging the valve 16 upwardly against the downward urge imparted thereto by the centrifugal force of the fly-weights 26. The valve arm 99 which pivotally controls valve 91 has a link 112 which connects with a lever 113, the latter having a second link 114 pivotally connected thereto. The link 114 is connected to a manually settable arm 115. For the moment we may consider the third pivot of lever 113, designated 116, as fixed, and it will be seen that with pivot 116 fixed oscillation of arm 115 oscillates valve 91 to change its degree of constriction.

It is thus seen that speed control or speed setting is accomplished entirely by hydraulic means without counter spring pressures or other mechanical biases of any kind against the flyweight mechanism. In conventional fly-weight mechanisms the major or entire centrifugal force of the fly-weight mechanism acts in opposition to a mechanical spring means.

The speed control means set forth in the foregoing permits an unusually wide range of speed settings with consistently accurate governing at all speeds, and the inherent hydraulic balance of the fly-weight mechanism makes for a new ease of operation. This new selectivity makes the present governor system especially suitable for combined speed and pressure regulation and therefore renders it useful in such adaptations as the control of engine driven compressors and pumps. In marine service, also, the wide range of flexibility of speed setting is exceptionally useful. The novel speed control is further advantageous in that it permits the valve 91 to be located remotely from the fly-weight mechanism and the pilot valve 16 by merely providing hydraulic conduits between the fly-weight mechanism and the valve 91. The valve 19 might thus be disposed in the pilot house of a boat or the cab of a locomotive.

The valve 91 is free and unbiased by spring pressures or the like. This permits free setting thereof throughout wide ranges of variation. In prior art variable speed governors adjustment has been accomplished by changing biasing spring pressures and the counter pressures encountered at high speeds are extremely high. This makes it very difficult to attain accurate adjustment and greatly limits the available range of speed settings. As stated above, the hydrodynamic speed setting valve 91 of the present invention offers substantially no resistance to speed setting adjustment.

As thus far described the governor system is isochronous, its speed being constant, for any given speed setting, regardless of the load, within usual operating limits. It is desired, however, to selectively adjust the governor system so as to introduce adjustable controlled speed droop, that is, a predetermined percentage of reduction in speed for each increase in load. To this end the pivot 116 of lever 113 is connected to a link 118 whose other end pivotally engages a lever 119. The lever 119 has a fulcrum support 120 which is adjustable toward and away from the pivotal connection with link 118 and the outer end of lever 119 pivotally engages connecting rod 46 of actuating piston 45.

In operation, the position of the throttle control shaft 11 directly reflects the prevailing load. Accordingly, the arm 47, connecting rod 46 and actuator piston 45, by their positions, also directly reflect the prevailing load. As shown in Fig. 1, an increase in load will cause connecting rod 46 to move downwardly. With the fulcrum support 120 set as shown, and with manual speed setting arm 115 in a given position, the pivotal connection between link 114 and lever 113 will serve as a fulcrum for the latter and downward movement of connecting rod 46 will accordingly move link 112 upwardly and produce the effect of slowing the speed setting by opening the valve 91 in proportion to the increase in load as evidenced by downward movement of connecting rod 46. This decrease in hydro-dynamic pressure beneath the pilot valve 16 causes downward movement thereof and results in pilot valve 16 resuming a normal neutral position at a lower load setting of actuating piston 45 and shaft 11. By this means the engine speed is reduced in proportion to the increase in load and is accordingly a function varying inversely with respect to the load. While the foregoing description of the speed droop control has, for clearness, been described sequentially, it is to be understood that speed droop adjustment occurs continuously and automatically and may occur with and during a governing and compensating cycle caused by a change in speed of the input shaft 10.

Movement of fulcrum support 120 toward the right in Fig. 1 lengthens the lever arm of the connecting rod 46 and shortens the lever arm of the link 118. This increases the ratio of the connecting rod lever arm to the link lever arm so that the percentage of speed droop is proportionately reduced. If the fulcrum support 120 is moved so that it is coincident with the pivotal connection of link 118 with lever 119, then movement of connecting rod 46 will have no effect on link 118 and the governor will operate isochronously, that is, with zero speed droop. While rarely required, it is obvious that negative speed droop may be introduced by extending the slot in lever 119 so that fulcrum support 120 may be moved to the right of the pivotal connection between link 118 and lever 119.

While the primary consideration in governor operation is usually accurate speed control, such control is only desired within certain maximum load limits and it is desired that such maximum load limits may be freely established and adjusted. It has previously been indicated that the prevailing load is directly indicated by the vertical position of the connecting rod 46. Accordingly a projection 125 is formed on the connecting rod 46 and lies in the path of one end of a lever 126 which is pivotally supported by a screw 128. The other end of lever 126 connects with a link 129 which in turn connects with a valve rod 130 of a valve 131 which is disposed in a cylinder 132. The cylinder 132 is disposed in conduit 86 and a compression coil spring 133 normally biases valve 131 to the illustrated position where fluid flow through conduit 86 by way of cylinder 132 is unimpeded. However, when the connecting rod 46 moves to a predetermined lower limit position the projection 125 engages the end of lever 126 and it, through link 129, raises valve 131 so that when the predetermined load limit position is reached, valve 131 blocks conduit 86. Vertical adjustment of the position of pivotal supporting screw 128 obviously varies the point at which projection 125 engages lever 126 and accordingly determines the load limit. Such adjustment is effected by changing the axial position of screw 128 with respect to internally threaded fixed supports 135, which is accomplished by manual rotation of knob 136.

While greatest clearness of disclosure is attained by the schematic mode of represenation employed in the drawings, it will be understood by those skilled in the art that all of the elements of Fig. 1 will be housed in a suitable unitary casing of any desired form and configuration, as has been suggested previously herein. It will further be clear to those skilled in the art that all of the various adjustable fulcrums and valves will have suitable connections accessible from the outside of such casing and that suitable dials for indicating prevailing speed, load limit and speed droop settings will likewise be provided.

As appears from Figs. 1 and 3, the opening 85 in sleeve 84 is trapezoidal and accordingly, upon opening movement of valve 70, the area of the orifice between notch 87 and opening 85 increases at greater than a straight line function of the degree of axial movement valve 70. This introduces a correcting factor so that the hydro-dynamic balancing force beneath pilot valve 16 may at all times be properly proportioned and opposed to the centrifugal force of the fly-weights at different axial positions of valve 70. However, without disturbing this varying orifice ratio, it is desired to adjust the orifice to hydro-dynamically adjust the governor characteristic known in the art as "sensitivity," that is, the measure of the amount which the governor speed indicating means will move for a certain load or speed change. This is accomplished, in the embodiment of Figs. 1, 2 and 3, by rotational adjustment of sleeve 84. To this end the upper portion of sleeve 84 has a sector gear 138 and a rack 139 is internally threaded to receive an axially stationary manually rotatable adjusting screw 140.

In the alternative form shown in Figs. 4 and 5 a sleeve or bushing 145, corresponding to bushing 84, is fixed and valve 146, corresponding to valve 70, is rotatably adjustable. As shown in Figs. 4 and 5, valve 146 has a valve head 147 with a vertically tapered passage 148 and sleeve has a pair of similarly tapered diametrically opposite passages 149. The tapered passages 148 and 149 cooperate to introduce a correcting factor as in the embodiment of Figs. 1, 2 and 3, upon axial adjustment of valve 146. However, upon rotational adjustment of valve 146, because the degree of taper of passages 148 and 149 is the same, their corrective relationship is not altered. As in Figs. 1, 2 and 3, the "sensitivity" of the governor is adjusted rotationally. To permit rotational adjustment of valve 146, its upper end is pivotally attached to a bracket 150 which corresponds to the bracket 72 of Fig. 1. A pin 151 extends laterally from valve 146 for engagement with a vertical slot 152 in a bracket 153, the latter being mounted for guided lineal movement on stationary sleeve 145, whereby axially stationary screw 154 may be manually rotated to oscillate valve 146.

Fig. 6 shows a modified load-limit adjustment and control wherein a lever 160, corresponding to lever 126 of Fig. 1, has pin and slot connection with actuating piston rod 46 and has an adjustable pivotal support 161 on a load-limit adjusting screw 162. An intermediate abutment 163 on lever 160 is arranged to engage enlargement 19 which supports the fly-weight linkage. Thus, when the maximum load setting is reached by downward movement of actuating piston 45, further movement thereof is positively prevented because pilot valve 16 is moved to neutral position and held against upward movement as long as abutment 163 is against enlargement 19.

Referring again to the present novel governor system generally, it is to be understood that use thereof is not confined to the control of prime movers, even though that is possibly the greatest present field of application. For instance, the governor of Fig. 1 may readily be associated with a controllable pitch propeller for aircraft, in which case variations in propeller speed will react through the governor system to vary the pitch of the blades thereof. There is an analogy in that in both cases the load of the system is adjusted, in one case by varying an engine fuel valve setting and in the other by changing the pitch of propeller blades. In any event, the claims are to be understood to cover a governor system of very general application.

What is claimed is:

1. A governor mechanism comprising a pressure chamber and a regulator member movable therein in response to pressure changes, a pair of fluid passages, one communicating with the pressure chamber at each side of said regulator member, a source of fluid pressure, pilot valve means normally closing both of said passages and movable in opposite directions to connect either side of said pressure chamber with said source of fluid pressure to shift the relative position of said regulator member in said chamber, speed responsive means adapted to exert against said pilot valve means forces varying with changes of speed, hydrodynamic fluid pressure chamber means acting in opposition to and normally balancing the forces of said speed responsive means, an inlet orifice and an outlet orifice for said hydrodynamic pressure chamber means, means for regulating one of said orifices to control the speed setting of the governor, compensating means, and means movable by said compensating means for varying the other of said orifices to variably control the hydrodynamic fluid pressure opposing the speed responsive means during restoration of speed following an adjustment of the relative position of said regulator member.

2. A hydraulic governor mechanism comprising an actuating piston and cylinder and a compensating piston and cylinder and fluid pressure means for producing relative movement between said pistons and their respective cylinders, a balanced pilot valve for said actuating cylinder and a balanced pilot valve for said compensating cylinder, speed-responsive means acting against said actuating pilot valve and hydrodynamic fluid pressure means acting to oppose and normally balance the action of the speed-responsive means and having a variable orifice, and valve means movable with said compensating pilot valve for varying said orifice to variably control the hydrodynamic fluid pressure opposing the speed-responsive means during restoration of speed following an adjustment of said actuating piston and cylinder.

3. A hydraulic governor mechanism comprising an actuating piston and cylinder and a compensating piston and cylinder and fluid pressure means for producing relative movement between said pistons and their respective cylinders, a balanced pilot valve for said actuating cylinder and a balanced pilot valve for said compensating cylinder, speed-responsive means acting against said actuating pilot valve and variable hydrodynamic fluid pressure means acting to oppose and normally balance the action of the speed-responsive means, and means movable with said compensating pilot valve to variably control the hydrodynamic fluid pressure opposing the speed-responsive means during restoration of speed following an adjustment of said actuating piston and cylinder.

4. A hydraulic governor mechanism comprising an actuating piston and cylinder and a compensating piston and cylinder and fluid pressure means for producing relative movement between said pistons and their respective cylinders, a balanced pilot valve for said actuating cylinder and a balanced pilot valve for said compensating cylinder, speed-responsive means acting against said actuating pilot valve and hydrodynamic fluid pressure means acting to oppose and normally balance the action of the speed-responsive means, said fluid pressure means having an adjustable speed setting orifice and a variable orifice, and valve means movable with said compensating pilot valve for varying said variable orifice to variably control the hydrodynamic fluid pressure opposing the speed-responsive means during restoration of speed following an adjustment of said actuating piston and cylinder.

5. A hydraulic governor mechanism comprising an actuating piston and cylinder and a compensating piston and cylinder and fluid pressure means for producing relative movement between said pistons and their respective cylinders, a balanced pilot valve for said actuating cylinder and a balanced pilot valve for said compensating cylinder, speed-responsive means acting against said actuating pilot valve and hydrodynamic fluid pressure means acting to oppose and normally balance the action of the speed-responsive means, said fluid pressure means having an adjustable speed setting orifice and a variable orifice, valve means movable with said compensating pilot valve for varying said variable orifice to variably control the hydrodynamic fluid pressure opposing the speed-responsive means during restoration of speed following an adjustment of said actuating piston and cylinder, and means movable by and upon relative movement between said actuating piston and cylinder for controlling said adjustable speed setting orifice whereby the speed setting varies with the prevailing load.

6. A hydraulic governor mechanism comprising an actuating piston and cylinder and a compensating piston and cylinder and fluid pressure means for producing relative movement between said pistons and their respective cylinders, a balanced pilot valve for said actuating cylinder and a balanced pilot valve for said compensating cylinder, speed responsive means acting against said actuating pilot valve and hydro-dynamic fluid pressure chamber means acting to oppose and normally balance the action of the speed responsive means, said fluid pressure chamber means having an inlet orifice and an outlet orifice, valve means for adjusting one of said orifices to determine governor speed setting, and valve means movable with said compensating pilot valve for varying said other orifice to variably control the hydro-dynamic fluid pressure opposing the speed responsive means during restoration of speed following an adjustment of said actuating piston and cylinder.

7. A hydraulic governor mechanism comprising an actuating piston and cylinder and a compensating piston and cylinder and fluid pressure means for producing relative movement between said pistons and their respective cylinders, a balanced pilot valve for said actuating cylinder and a balanced pilot valve for said compensating cylinder, speed responsive means acting against said actuating pilot valve and hydro-dynamic fluid pressure chamber means acting to oppose and normally balance the action of the speed responsive means, said fluid pressure chamber means having an inlet orifice and an outlet orifice, means for adjusting one of said orifices to determine governor speed setting, means movable with said compensating pilot valve for varying said other orifice to variably control the hydro-dynamic fluid pressure opposing the speed responsive means during restoration of speed following an adjustment of said actuating piston and cylinder, and means for further adjusting said other orifice to vary the sensitivity of the speed responsive means.

8. A hydraulic governor mechanism comprising an actuating piston and cylinder and a compensating piston and cylinder and fluid pressure means for producing relative movement between said pistons and their respective cylinders, a balanced pilot valve for said actuating cylinder and a balanced pilot valve for said compensating cylinder, speed responsive means acting against said actuating pilot valve and hydro-dynamic fluid pressure chamber means acting to oppose and normally balance the action of the speed responsive means, said fluid pressure chamber means having an inlet orifice and an outlet orifice, means for adjusting one of said orifices to determine governor speed setting, means movable by and upon relative movement of said actuating piston and cylinder for controlling said orifice adjusting means whereby the speed setting varies with the prevailing load, and means movable with said compensating pilot valve for varying said other orifice to variably control the hydrodynamic fluid pressure opposing the speed responsive means during restoration of speed following an adjustment of said actuating piston and cylinder.

ARMIN H. RODECK.
ALBERT G. MASSEY.

REFERENCES CITED

The following references are of record in the file of this patent:

UNITED STATES PATENTS

| Number | Name | Date |
|---|---|---|
| 2,106,684 | Ring | Jan. 26, 1938 |
| 2,197,743 | Crafts et al. | Apr. 16, 1940 |
| 2,239,602 | Gottlieb | Apr. 22, 1941 |
| 2,341,384 | Kalin | Feb. 8, 1944 |

FOREIGN PATENTS

| Number | Country | Date |
|---|---|---|
| 114,836 | Great Britain | 1919 |